(12) United States Patent
Chaji et al.

(10) Patent No.: US 12,634,430 B2
(45) Date of Patent: May 19, 2026

(54) NONINTRUSIVE HEAD-MOUNTED DEVICE

(71) Applicant: VueReal Inc., Waterloo (CA)

(72) Inventors: Gholamreza Chaji, Waterloo (CA); John Cronin, Jericho, VT (US)

(73) Assignee: VueReal Inc., Waterloo (CA)

( * ) Notice: Subject to any disclaimer, the term of this patent is extended or adjusted under 35 U.S.C. 154(b) by 0 days.

(21) Appl. No.: 18/838,722

(22) PCT Filed: Feb. 13, 2023

(86) PCT No.: PCT/CA2023/050181

§ 371 (c)(1),
(2) Date: Aug. 15, 2024

(87) PCT Pub. No.: WO2023/154996

PCT Pub. Date: Aug. 24, 2023

(65) Prior Publication Data

US 2025/0159127 A1 May 15, 2025

Related U.S. Application Data

(60) Provisional application No. 63/310,170, filed on Feb. 15, 2022.

(51) Int. Cl.
*H04N 13/344* (2018.01)
*G02B 27/01* (2006.01)
(Continued)

(52) U.S. Cl.
CPC ....... *H04N 13/344* (2018.05); *G02B 27/0172* (2013.01); *G02B 27/0176* (2013.01);
(Continued)

(58) Field of Classification Search
CPC ............ G02B 27/0176; G02B 27/0179; G02B 2027/0154; G02B 2027/0161;
(Continued)

(56) References Cited

U.S. PATENT DOCUMENTS 9,094,677 B1 * 7/2015 Mendis ............. G02B 27/0176
9,429,772 B1 8/2016 Heinrich et al.
(Continued)

FOREIGN PATENT DOCUMENTS

WO 20120113092 A1 5/2012
WO WO-2020243829 A1 * 12/2020 .............. G09F 9/33

OTHER PUBLICATIONS

WIPO: International Search Report and Written Opinion relating to PCT Application No. PCT/CA2023/050181, dated Apr. 4, 2023.

*Primary Examiner* — Xuemei Zheng

(57) ABSTRACT

Systems, devices, and methods for a head-mounted device are provided. In some examples, a head-mounted device comprising a frame having at least one arm that may be adjustable, at least one display coupled at a proximity edge of the at least one arm, an electronic system coupled at a proximity another edge of the at least one arm, a data processing unit configured to send and receive data from the display, wherein the data processing unit coupled through the arm between the electronic system and the display; and an optical system configured to project an image from the display to a user's eye, wherein the optical system is mounted at the top of the display.

27 Claims, 9 Drawing Sheets

(51) Int. Cl.
*G09G 3/32* (2016.01)
*H04N 9/31* (2006.01)
*H04N 13/383* (2018.01)

(52) U.S. Cl.
CPC ............. *G09G 3/32* (2013.01); *H04N 9/3173* (2013.01); *H04N 13/383* (2018.05); *G02B 2027/0159* (2013.01); *G02B 2027/0178* (2013.01); *G09G 2354/00* (2013.01); *G09G 2370/16* (2013.01); *H04N 2213/002* (2013.01)

(58) Field of Classification Search
CPC ............. G02B 27/0172; H04N 13/344; H04N 13/383; H04N 9/3173; G09G 3/32
See application file for complete search history.

(56) References Cited

U.S. PATENT DOCUMENTS

| | | | | |
|---|---|---|---|---|
| 9,823,494 | B2 * | 11/2017 | Blum | G02C 11/10 |
| 10,509,466 | B1 * | 12/2019 | Miller | G06T 7/60 |
| 12,066,630 | B2 * | 8/2024 | Chaji | G09F 9/33 |
| 2010/0079356 | A1 * | 4/2010 | Hoellwarth | H04B 1/385<br>345/8 |
| 2011/0273365 | A1 * | 11/2011 | West | G02B 27/0179<br>29/428 |
| 2015/0123881 | A1 * | 5/2015 | Sugihara | G02B 27/017<br>345/8 |
| 2015/0268475 | A1 * | 9/2015 | Lee | G02B 27/0176<br>345/8 |
| 2017/0090200 | A1 * | 3/2017 | Motoe | G02B 27/0176 |
| 2019/0310477 | A1 * | 10/2019 | Ren | A61B 3/12 |
| 2021/0255480 | A1 * | 8/2021 | Ryner | G02B 27/0176 |

* cited by examiner

NONINTRUSIVE HEAD-MOUNTED DEVICE

FIELD OF THE INVENTION

The present disclosure relates to a wearable head-mounted device employing one or more displays with an optical system placed on top of the display.

BACKGROUND OF THE INVENTION

Conventionally, head-mounted devices (HMDs) have one or two displays with digital projectors and microscopic mirrors embedded in the device to project images onto the eye of a user. Because of all this circuitry, often the HMDs are heavy and difficult to carry for longer periods of time. Further, these devices offer a limited field of view and a displeasing experience for the user.

Moreover, the display may include cathode ray tubes (CRT), liquid-crystal displays (LCDs), liquid crystal on silicon (LCOS), or organic light-emitting diodes (OLED). These conventional displays suffer with low brightness, high power consumption and shorter life span.

The efficiency of HMD structure used today is very low as lots of light is being lost in the path from the display to the eye. Considering the small area of the HMD, the power efficiency is very important to reduce the battery size and the weight of the device. Furthermore, most of the devices are very bulky due to the complicated path used to move the image from the display into the user's eyes.

Therefore, there is a need for an improved HMD that is simple in structure and can offer better field of view, high brightness, and low power consumption.

SUMMARY

According to one aspect of the invention, the invention discloses a head-mounted device comprising, a frame having at least one arm adjustable in length, at least one display coupled at a proximity edge of the at least one arm, an electronic system coupled at a proximity another edge of the at least one arm, a data processing unit configured to send and receive data from the display, wherein the data processing unit coupled through the arm between the electronic system and the display, and an optical system configured to project an image from the display to a user's eye, wherein the optical system is mounted at the top of the display.

According to another aspect of the invention, the invention discloses a head mounted device comprising, a frame having at least one arm adjustable in length, at least one display mounted on the frame in front of a user's eye, an electronic system coupled at a proximity edge of the arm and an optical system placed between the display and the user's eye to project an image from the display to the user's eye.

BRIEF DESCRIPTION OF THE DRAWINGS

The foregoing and other advantages of the disclosure will become apparent upon reading the following detailed description and upon reference to the drawings.

Use of the same reference numbers in different figures indicates similar or identical elements.

Figure 1A:
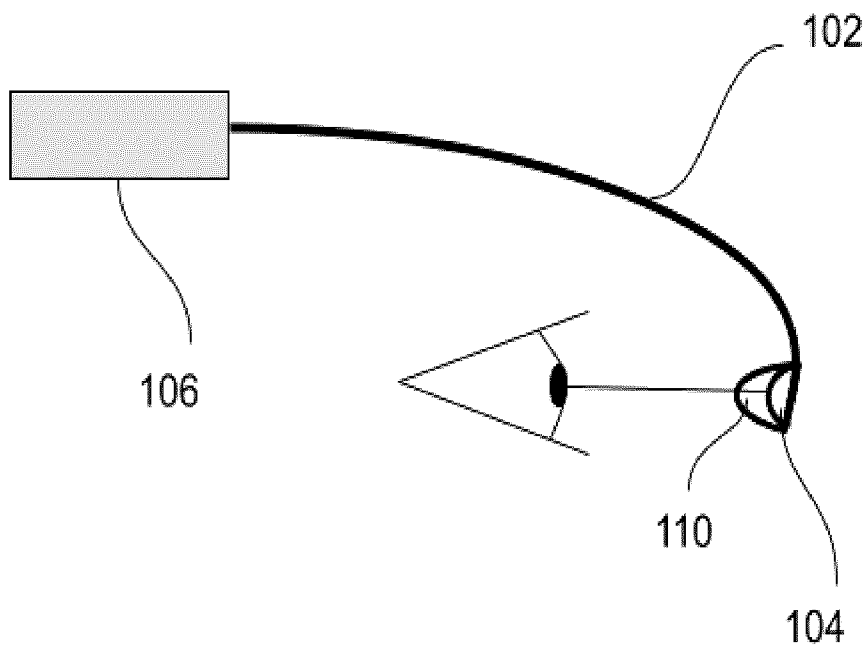
FIG. 1 is a schematic diagram of a head-mounted device, in accordance with an embodiment of the invention.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure covers all modifications, equivalents, and alternatives falling within the spirit of the invention as defined by the appended claims.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

This disclosure relates to display devices and more particularly to wearable head-mounted display devices. The disclosure further provides methods for implementing a head mounted device and a display using the structure and components of the device. The head-mounted devices (HMD) may comprise smart eyeglasses, virtual reality headsets, augmented reality headsets and mixed reality headsets. Here, the head-mounted device is implemented as eyeglasses for the purpose of illustration. Head-mounted devices (HMDs) refer to a type of device that is worn on the head and displays digital content in front of the user's eyes. These can include smart eyeglasses, virtual reality (VR) headsets, augmented reality (AR) headsets, and mixed reality (MR) headsets. Smart eyeglasses typically display information like text messages or notifications, while VR and AR/MR headsets typically display more immersive digital content. Head-mounted devices can be mounted to other headgear such as hats, headbands, helmets, and face masks. This can provide additional support and stability for the device, and in some cases, such as when using a face mask, it can allow the device to be worn in situations where it would not be possible to wear the device directly on the face. Some devices are specifically designed to be integrated into other head gear such as helmets and sports goggles, while others can be mounted using accessory mounts or adapters.

Furthermore, this disclosure provides a wearable head-mounted display having a micro-LED display. The wearable HMD integrated with a micro-LED display may offer simpler devices, high resolution, contrast, luminance and low power consumption compared with conventional displays. A wearable head-mounted display (HMD) with a micro-LED display is one possible configuration for a head-mounted device. Micro LED is a type of display technology that uses tiny LED lights to create the pixels for the display. This technology has many benefits over traditional display technologies such as LCD and OLED, such as higher brightness and contrast, faster response times, and lower power consumption. A head-mounted device with a micro-LED display would provide a high-quality visual experience for the user, and the small size of the LED lights would allow for a more compact and lightweight design of the device.

FIG. 1 is a schematic diagram of a head-mounted device, in accordance with an embodiment of the invention. Here, a display may be mounted on a frame in front of the eye that communicates with an electronic system to project an image into the eye through an optics that is between the eye and the display. Communication may happen through different means. In one case, the arm of the frame of the HMD can be used to carry either power or data signals that are coupled to the display. This can reduce the number of cables or connectors required for the device, making it more compact and user-friendly. For example, the arm of the frame could be used to transmit power to the display, eliminating the need for a separate battery or power cord. Or alternatively, it could be used to transmit data signals to the display, such as video and audio content, eliminating the need for a separate cable to connect the device to a computer or other source of content. This approach is also known as a "cable-free" solution for HMDs, where the power or data transmission is done wirelessly.

In one related case, the display is smaller than the eye. In one related case, the display dimensions are smaller than 10 mm. The display or optics are held by a frame the width dimension parallel with the eye is less than 10 mm. In one related case, the frame width is smaller than the display in some areas. In another related embodiment, the display or optics are held by a transparent window. The window can be part of eyewear such as glasses. There are conductive traces connecting the displays to the system. The traces can be a collection of thinner traces spaced to reduce the impact on blocking the user's viewing point. The traces can carry signals or power. In one related embodiment, the trace carries both power and signals to the display; this reduces the number of traces. There are typically conductive traces connecting the displays in the HMD to the system's electronic components. These traces carry the power and data signals required to operate the display. To minimize the impact on the user's viewing experience, the traces can be designed to be as thin as possible, and they can be spaced in such a way as to reduce the amount of light they block. This can be done by using a collection of thinner traces, or by using a transparent or semi-transparent material for the traces. Additionally, they can be placed in a way that they are not directly in front of the user's eye or in a way where they are less visible. This can help to ensure that the user has an unobstructed view of the digital content displayed on the HMD.

The display can be bonded to the frame or window by adhesive, screws, clips, or by conductive bonding. In case of conductive bonding, there are pads on opposite sides of the display emission surface. The pads connect the traces to the display circuitry. The display in a head-mounted device can be bonded to the frame or window in several ways. Adhesive, screws, clips, or conductive bonding are all methods that can be used to securely attach the display to the device.

Adhesive bonding is a method where a liquid or solid adhesive is used to attach the display to the frame or window. This method is relatively quick and easy, and it can provide a strong bond.

Screws, clips, or other mechanical fasteners can also be used to attach the display to the frame or window. This method is typically more secure and durable than adhesive bonding, but it may be more difficult to implement.

Conductive bonding is a method where the display and the frame or window are bonded together using a conductive material. This can help to reduce the resistance and improve the signal quality in the conductive traces connecting the display to the system.

The choice of bonding method will depend on the specific requirements of the device and the design trade-offs that are acceptable for the device.

There can be more than one display for each eye. The displays can be different colours or the same type of display. In the case of different colours, the displays or optics can be designed to direct the lights from different displays to overlap and so create a full-color image. In a head-mounted device, there can be more than one display for each eye, known as a multi-panel display. This can provide additional flexibility in terms of the visual experience provided to the user. For example, the device could use one display for each eye that is specifically designed to display different types of content, such as 3D content or wide-angle content.

Additionally, the displays can be different colours or the same type of display. For example, one display may be used for each eye that has a different colour filter, such as red and blue, to create a 3D image. Or, two displays of the same type and colour can be used to create a more seamless and natural visual experience. The choice of display type and number will depend on the specific requirements of the device and the design trade-offs that are acceptable for the device.

Figure 1B:
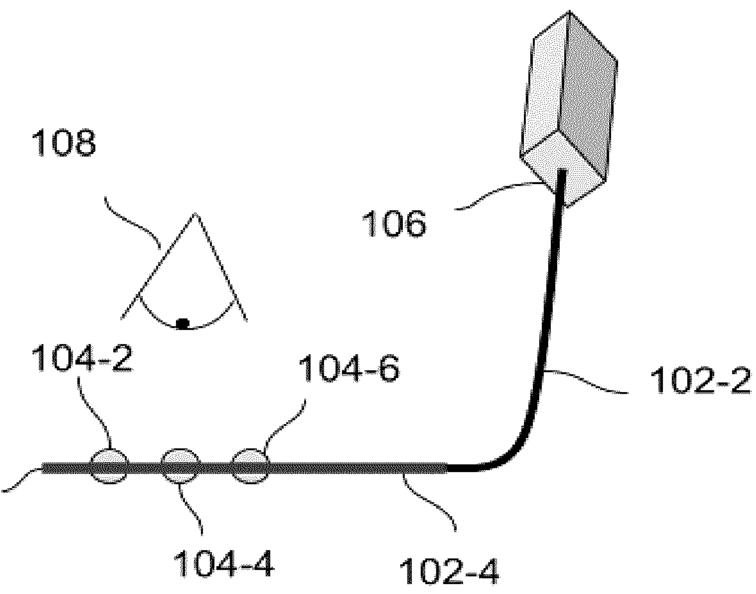

In one related embodiment shown in FIG. 1A and FIG. 1B, the control and communication system are packed in one system, unit 106. This unit can include batteries, video and control data interfaces, and other processing blocks. A head-mounted device's control and communication system can be packed into one system unit. This unit can include various components such as batteries to power the device, interfaces for video and control data to connect the device to other devices or sources of content, and other processing blocks such as microprocessors, memory chips, and sensors. This central unit can be used to control the operation of the device, such as the display, audio, and other features, as well as to process and transmit data to and from the device. Having all the control and communication in one unit simplifies the design and makes the device more compact and user-friendly. The interfaces can be wireless or wired. Part of the system unit pack can be shaped to go around the user's ears. There can be a configurable part in the system unit that can be adjusted for different users to improve the comfort of each user. There can be a configurable part in the system unit of a head-mounted device that can be adjusted for different users to improve comfortability. This can include adjustable straps or bands to fit the device securely to the user's head, adjustable lenses or optics to accommodate different vision needs, or adjustable inter-pupillary distance (IPD) to align the display with the user's eyes.

Additionally, the device can include some sensors to detect the user's head movements or facial features and use that information to adjust the display or the audio accordingly. This allows the device to provide a more personalized and comfortable experience for each user, which can improve the overall usability of the device.

The processing unit is connected to the display and optic architecture through arm 102. The arm 102 has parts 102-4 approximately parallel to the user's eyes 108. A display 104 (or optics 110) is mounted on the arm 102-4 parallel to the user's eye. The connection part of the arm 102-2 connects the parallel arm 102-4 to system unit 106. The connection part can be flexible to be adjusted for different users. The connection part of the head-mounted device, also known as the interface, can be flexible and adjusted for different users. The interface can include various components such as connectors, ports, and wireless communication modules that allow the device to connect to other devices or sources of content, such as a computer, a smartphone, or a streaming service. The interface can be designed to be flexible, so that it can accommodate different types of connections, such as USB, HDMI, or Wi-Fi, to suit the needs of different users.

Additionally, the interface can be designed to be modular and adjustable so that different parts can be added or removed to accommodate different types of connections or to allow for upgrades or repairs. This allows the device to be more flexible and adaptable, and it can help to ensure that the device can continue to be used even as technology evolves.

There can be more than one display 104-2, 104-4, and 104-6 connected to the parallel arm 102-4. The images from displays 104-2, 104-4, and 104-6 can be seen by the eye separately, or optics can merge them to create a single image. The parallel part 102-4 can be thinner than the width of the display(s) 104-2, 104-4, and 104-6. The displays 104-2, 104-4, and 104-6 can be emissive displays producing images directly. The displays in a head-mounted device can be emissive displays, which produce images directly. Emissive displays are a type of display technology that produces light directly from the pixels of the display. Examples of emissive displays include OLED and Micro-LED displays.

These displays can produce bright and high-contrast images and can be more power-efficient than other displays, such as LCD, which require a backlight to produce images. Emissive displays can also have faster refresh rates and response times, which can be important for virtual and augmented reality applications, where the display needs to keep up with the user's head movements.

Emissive displays are also beneficial for the HMDs in terms of the visual experience because they can provide a wider range of colours, deeper blacks and brighter whites, which is essential for immersive experiences.

Figure 1C:
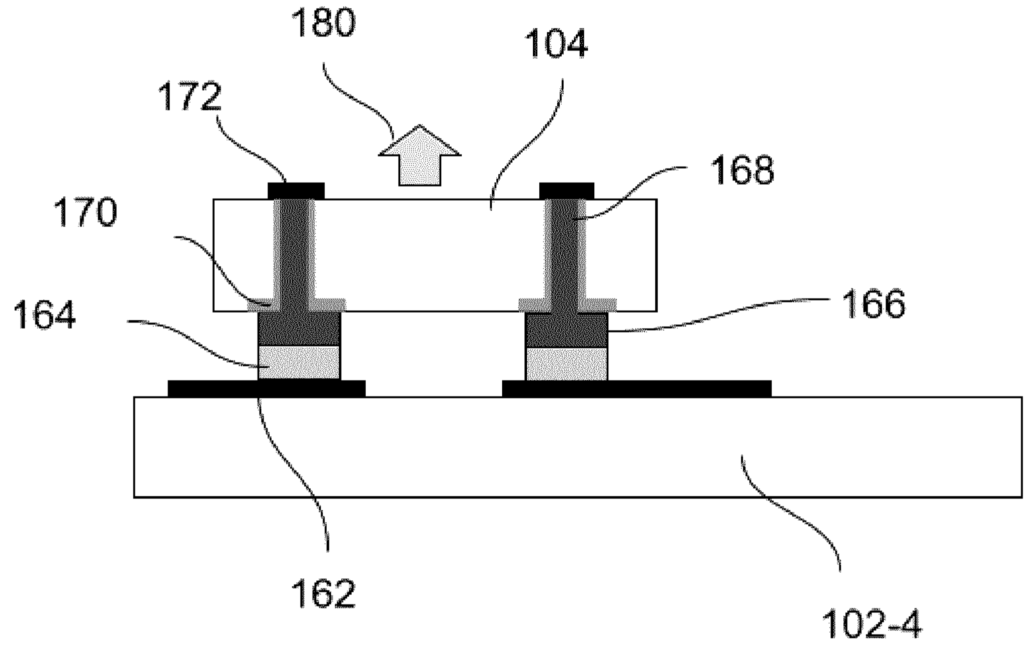

FIG. 1C shows one method and structure of connecting the display to the parallel arm 102. The image 180 is displayed away from the arm 102-4 toward the eye. The contact pads 166 are at the other side of the display substrate, different from the display image surface. The pads 166 are connected to the display electrodes 172 through VIAs 168. The dielectric layer 170 covers the side of VIA 168. Inside the VIA or the wall of the VIA covered by the conductive layers. The display pads 166 are bonded to pads 164 on the parallel arm 164. The pads are connected to arm electrodes 162. The arm electrodes 162 are coupled to the system unit through the connection arm 102-2. In a head-mounted device, the contact pads 166 for the display are typically located on the opposite side of the display substrate from the display image surface. These pads are connected to the display electrodes through VIA connections, which are small holes that pass through the substrate and connect the top and bottom layers of the display. The via connections 168 are covered by a dielectric layer 170, which insulates the connection and prevents short circuits.

The conductive layer inside the via 168 or on the wall of the via 168 is used to connect the display electrodes and the contact pads 166. The display pads 166 are then bonded to pads on the parallel arm, which are the conductive traces that run along the arm of the frame and connect the display to the system unit. This design allows for a more compact and efficient way of connecting the display to the system unit and ensures a stable and reliable connection.

Figure 1D:
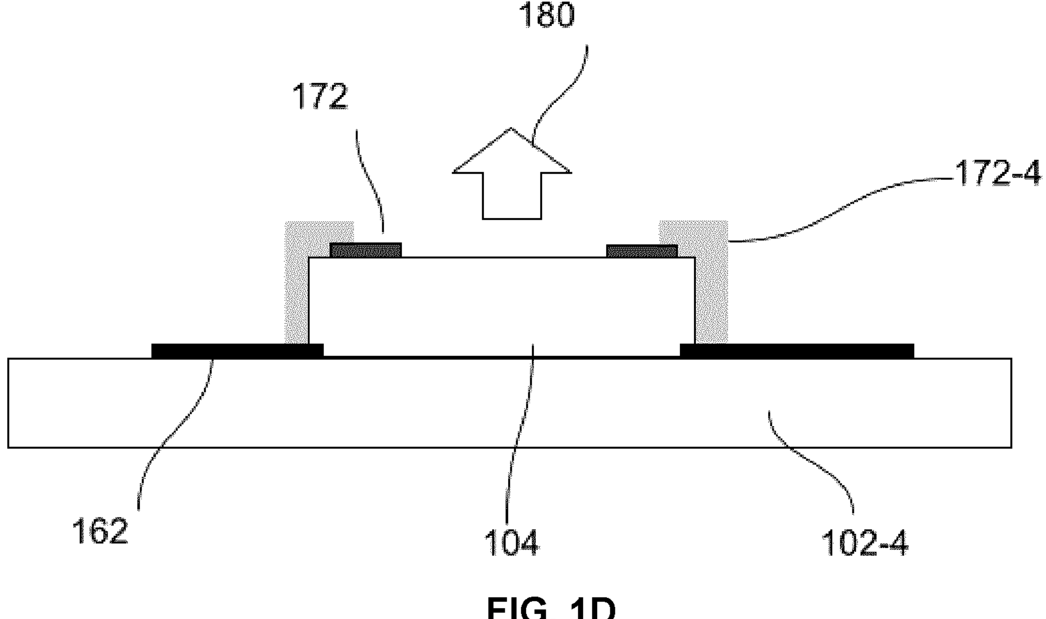

FIG. 1D shows another method and structure for connecting the displays 104 to parallel arm 102-4. Here, a connection 162-4 connects the display electrode 172 to the arm electrode 162. The connection 172-4 can be done by depositing or printing conductive materials or by wire bonding. FIG. 1D shows another method and structure for connecting the displays 104 to parallel arm 102-4. Here, connection 162-4 connects the display electrode 172 to the arm electrode 162. This method is a different way to connect the display to the parallel arm, compared to the previous example, where the contact pads were located on the opposite side of the display substrate.

The connection 172-4 can be done by depositing or printing conductive materials, such as metals or conductive polymers, or by wire bonding. Depositing or printing conductive materials is a process where a thin layer of conductive material is applied to the surface of the display electrode or the arm electrode to create the connection. Wire bonding is a process where a thin wire is used to connect the display electrode to the arm electrode. Both of these methods can be used to create a stable and reliable electrical connection between the display and the arm.

The choice of the connection method will depend on the specific requirements of the device, the design trade-offs that are acceptable and the manufacturing process.

Figure 1E:
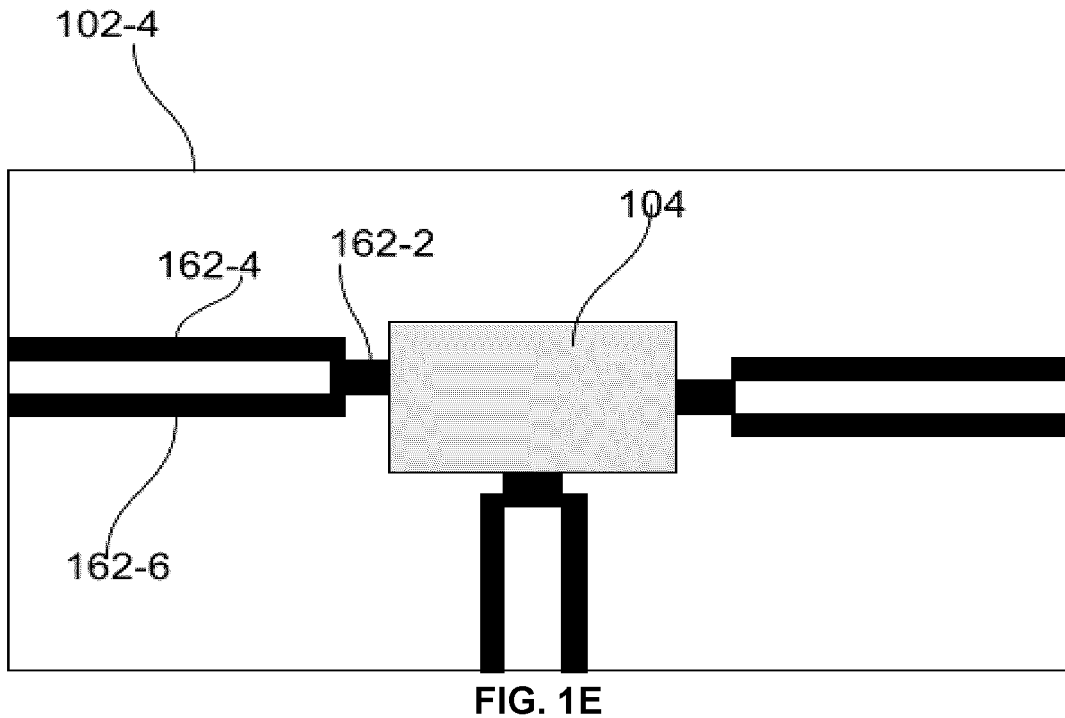

FIG. 1E shows a related exemplary embodiment for forming arm electrodes 162. Here, the electrode can be divided into at least two branches 162-4 162-6 to reduce the visual impact without compromising the electrical characteristics of the electrodes. The electrodes 162 can be one branch 162-2 at a point close to the display 104. FIG. 1E shows an exemplary embodiment for forming arm electrodes 162 in which the electrode is divided into at least two branches 162-4, 162-6 to reduce the visual impact on the user's view without compromising the electrical characteristics of the electrodes. This design allows the electrodes to be placed in a way that they are less visible to the user while still providing an adequate electrical connection between the display and the system unit.

Additionally, the electrode can be one branch 162-2 at a point close to the display 104. This design can be used to minimize the number of branches, which can further reduce the visual impact on the user's view and simplify the design of the device.

Figure 1F:
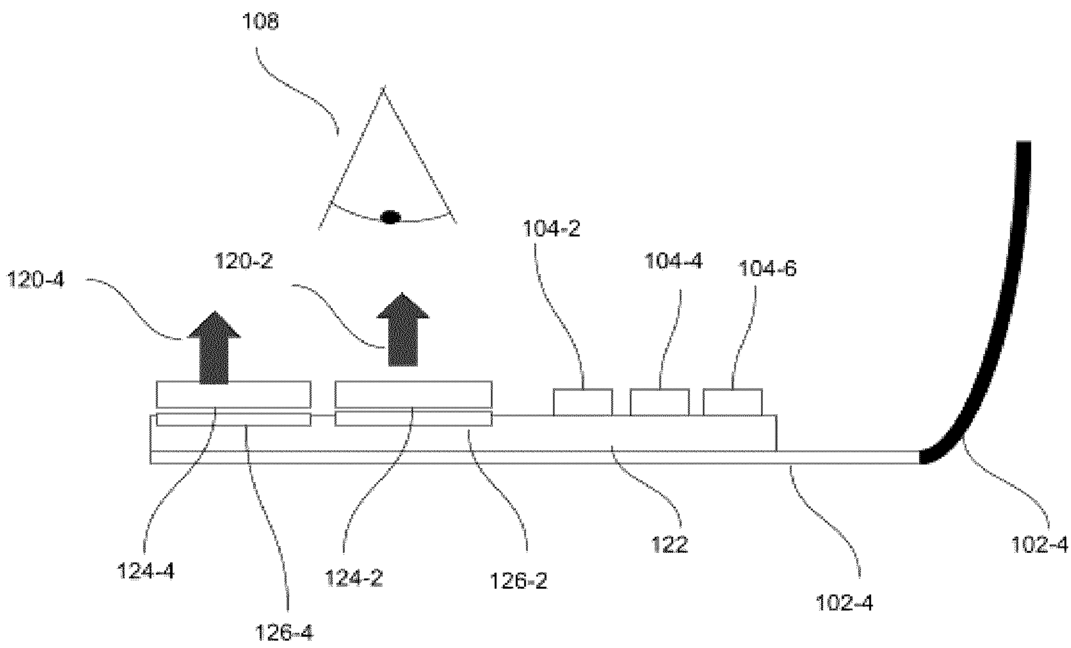

The choice of the design of the electrodes will depend on the specific requirements of the device, the design trade-offs that are acceptable, and the manufacturing process FIG. 1F shows a related embodiment creating an image indirectly into users' eyes. Here, the image from at least one display(s) 104-2, 104-4, 104-6 is coupled to a substrate 122. The substrate can be a waveguide or a reflector to reflect the display light in parallel with the substrate 122. There is at least one open area 126-2, 126-4 for the eye. The images get out of the substrate 122 through the said open area coupled to an optical structure (e.g., a lens) 124-2, 124-4 to project the image 120-2, 120-4 into the user's eyes. In one case, the open area 126-2 can be smaller than the display area 104-2.

There is at least one open area 126-2, 126-4 that the images get out of the substrate 122 coupled to an optical structure (e.g., a lens) 124-2, 124-4 to project the image into the user's eyes. This design allows the image to be projected into the user's eyes without the need for the display to be directly in front of the eyes, which can reduce the visual impact on the user's view and improve the overall visual experience.

In one case, the opening area 126-2 can be smaller than the display area 104-2. This can help to reduce the size and weight of the device, and it can also improve the overall visual experience by making the display less visible to the user.

This type of design is also known as a near-eye display, where the image is projected very close to the eye, creating an illusion of a large display. As a result, the eye will not be blocked by the substrate 122. There can be more than one eye opening area 126-2, 126-4. The opening areas can show the same images in different physical areas, providing information to the user's eye independent of viewing direction. In another related image, the opening shows different images to create larger images. Each opening area 126-2, 126-4 has an optical device (e.g., lens) 124-2, 124-4 on top.

The optical devices in a head-mounted device, such as lenses, are used to project the image into the viewer's eye and enable creating a focused image. These devices can be a combination of lenses, such as multiple lenses arranged in a specific configuration, to provide the desired level of magnification and focus.

In one related embodiment, one of the lenses can be a convex lens. A convex lens is a type of lens that bulges outwards, and it can be used to magnify an image, by bending the light rays passing through it and making them converge. Convex lens can also be used in combination with other types of lenses, such as concave lenses or aspheric lenses, to achieve the desired level of focus and distortion correction.

The choice of optical devices will depend on the specific requirements of the device, the acceptable design trade-offs, and the manufacturing process. Some factors that can be taken into account when selecting the lenses include the field of view, the distortion, the resolution and the focus depth.

In one related embodiment, the substrate 122 combines the images from multiple displays in one image that can be shown in one or more than one viewing openings 126-2, 126-4. The displays can be made of different colours, and the combination forms a full-colour image. In another related embodiment, the substrate 122 and the parallel arm 102-4 are the same.

In one related embodiment, the substrate areas in the field of view of the user can be designed to be narrower than what can be seen in a close distance to the user's eyes. This can help to reduce the visual impact of the substrate on the user's view and improve the overall visual experience.

In one related case, the width of the substrate in the field of view can be smaller than 10 mm. This can help to further reduce the visual impact of the substrate on the user's view, making it less visible and more like a natural viewing experience.

In one related case, the substrate can be transparent in most areas. This can help to reduce the visual impact of the substrate even further, and it can also improve the overall visual experience by making the display appear more like it is part of the user's natural environment. Additionally, it can also reduce glare and reflections, which are common issues in transparent surfaces.

This type of design is also known as a see-through display, where the user can see the real world through the display, and the digital content is superimposed on top of it.

In one related structure related to the embodiments described here, the lens and optical devices are smaller than 10 mm to not block the user's field of view.

The display or optical structure in the embodiments described here are physically close to the eyes so that the eye cannot focus on them and therefore the display or optical structure cannot block the eye field of view, and they appear to be transparent. The display or optical structure in the embodiments can also be described here are physically close to the eyes so that the eye cannot focus on them. This causes the eye's accommodation mechanism to not focus on the display or optical structure, and as a result, the display or optical structure does not block the eye's field of view, and they appear to be transparent to the user. This can improve the overall visual experience by creating an illusion of a transparent display that allows the user to see the real world while still being able to view the digital content projected by the device.

Figure 2A:
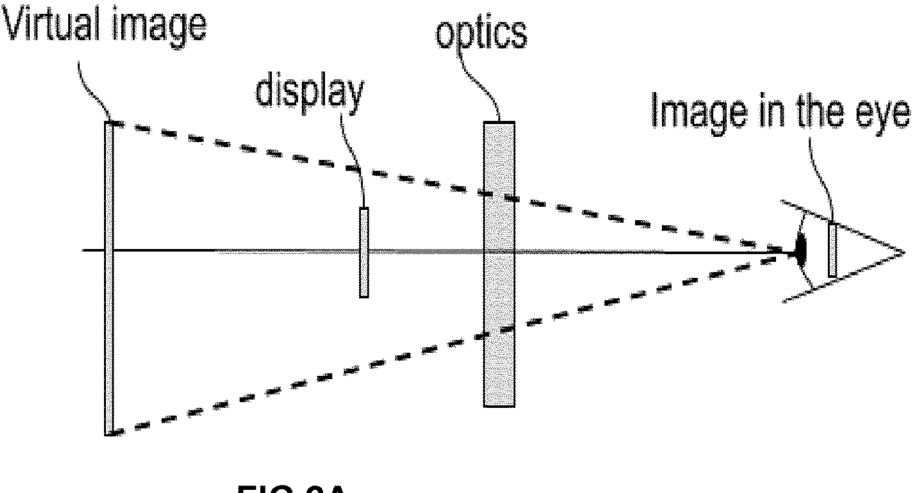
FIG. 2 shows an example of an optical system creating a virtual image of the display, in accordance with an embodiment of the invention.

FIG. 2A demonstrates the optics (optical device) in front of the eye and display. The display and optical devices are at a distance from the eye, and the eye cannot focus on them naturally. The display is between the focal point of the optics and the optics. As a result, the image created is a large image at a further distance and focused on the eye. The distance between the display and optics can be adjusted to create the image in different positions depending on the eye focus point. Here, a level structure contracts or expands and adjusts the distance between the display and optics.

By adjusting the distance between the display and the optics, the device can change the position of the projected image relative to the eye, allowing the user to view the image at different distances. This is known as the vergence-accommodation conflict, and this kind of adjustment can improve the overall visual experience and reduce the strain on the user's eyes.

Additionally, this adjustment can be made automatically using sensors to detect the user's gaze or focus point and adjust the image position accordingly. This can provide a more seamless and natural visual experience for the user.

The level structure can be an electro polymer or piezo material. In this case, the level structure is connected to a bias voltage that can control the movement of the level. In one case, two sides of the level is secured, and the optics or displays are mounted in the middle of the level. Hare, applying a bias moves the center of the level ups or down. In the case of using a display and optics for each eye, the level can be used to calibrate the two displays and optics to overlap the images created for each eye. In another related embodiment, the optical system may consist of an adjustable component, such as a liquid crystal lens. Where the lens parameter can be adjusted with an external field. A liquid crystal lens uses liquid crystals to change the refractive index of the lens, which can be used to adjust the lens's focus. The lens parameter can be adjusted with an external field, such as an electric field, which can control the alignment of the liquid crystals in the lens.

This type of lens can provide a fast and precise focus adjustment, and the lens can be easily integrated into the head-mounted device. Additionally, this type of lens can be useful for accommodating the display or the optical structure, as the lens can be adjusted to match the distance of the object, which can reduce the strain on the user's eyes.

This type of lens also can be used in combination with other types of lenses, such as aspheric lenses, to achieve the desired level of focus and distortion correction. As a result, the lens parameter can be adjusted depending on the depth of focus point required for the image.

Figure 2B:
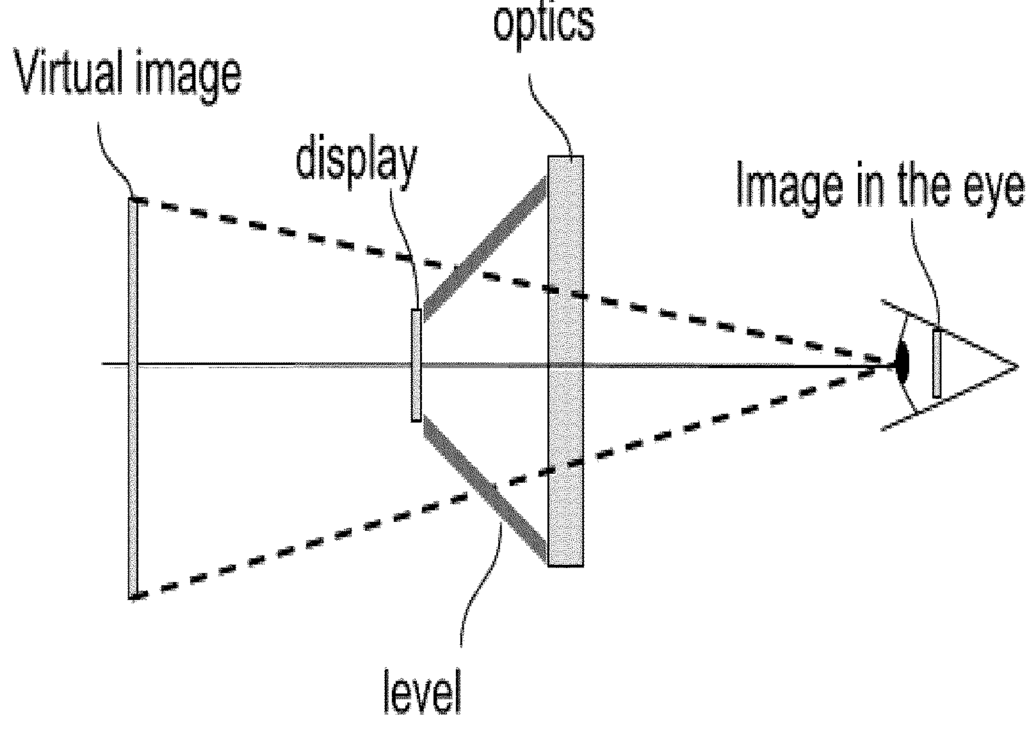

The structure described in FIGS. 1 and 2 can be applied to the structures and embodiment described in the other figures.

The head-mounted device may include a frame. The frame may comprise a pair of glasses or a helmet configured to be worn on a user's head. The frame may include at least one arm 102. In one case, two arms may be on two sides of the frame. In another case, there may be no arm attached to the frame. Here, for example, the frame comprises the structure of an eyeglass.

In one case, the arm 102 may be made of transparent materials and include conductive traces (wire) for communicating and providing power to the display 104. The arm 102 can be pre-formed or can be flexible to be formed by a user.

In one embodiment, an electronic system 106 is coupled at a proximity edge (end) of the arm 102. The electronic system may include a processing unit, a communication unit, a synching unit, and a power unit. The processing unit may include a processor to execute instructions. The communication unit may be configured to communicate with the electronic system and the display unit to receive an image. A data processing unit may be coupled through the arm between the electronic system and the display to send and receive data and instructions from the display and other units. The HMD may receive external power through the power unit. The power unit may supply power to the electronic system.

In one embodiment, the HMD further includes at least one display 104 coupled at another proximity edge (end) of the arm. The display may comprise a microdisplay device. The microdisplay may be a micro light-emitting diode device. The display unit is configured to emit images or image information to the user. The display receives power or data signals through the electronic system 106 coupled to the arm.

In one embodiment, an optical system 110 may be provided on top of the display 106 that projects an image displayed on the display 106 into the user's eye. The optical system may include one or more lenses. The lenses may be concave. The optical system 110 is placed between the display and the user's eye.

In one embodiment, the HMD may further include gesture sensors operable to detect when the user is looking at the display to start projecting images. In another embodiment, there may be sensors to measure the eye focus distance to adjust the optic focal point for the image to be in the eye's focus point.

FIG. 2 shows an example of an optical system with a display. Here, the optical system 202 is placed between the display 204 and the user's eye. The optical system 202 forms a virtual image 206 further away from the user's face after it is projected into the user's eyes 210. The virtual image 206 is also magnified to enable ease of access to the information and data from the display 204.

Figure 3A:
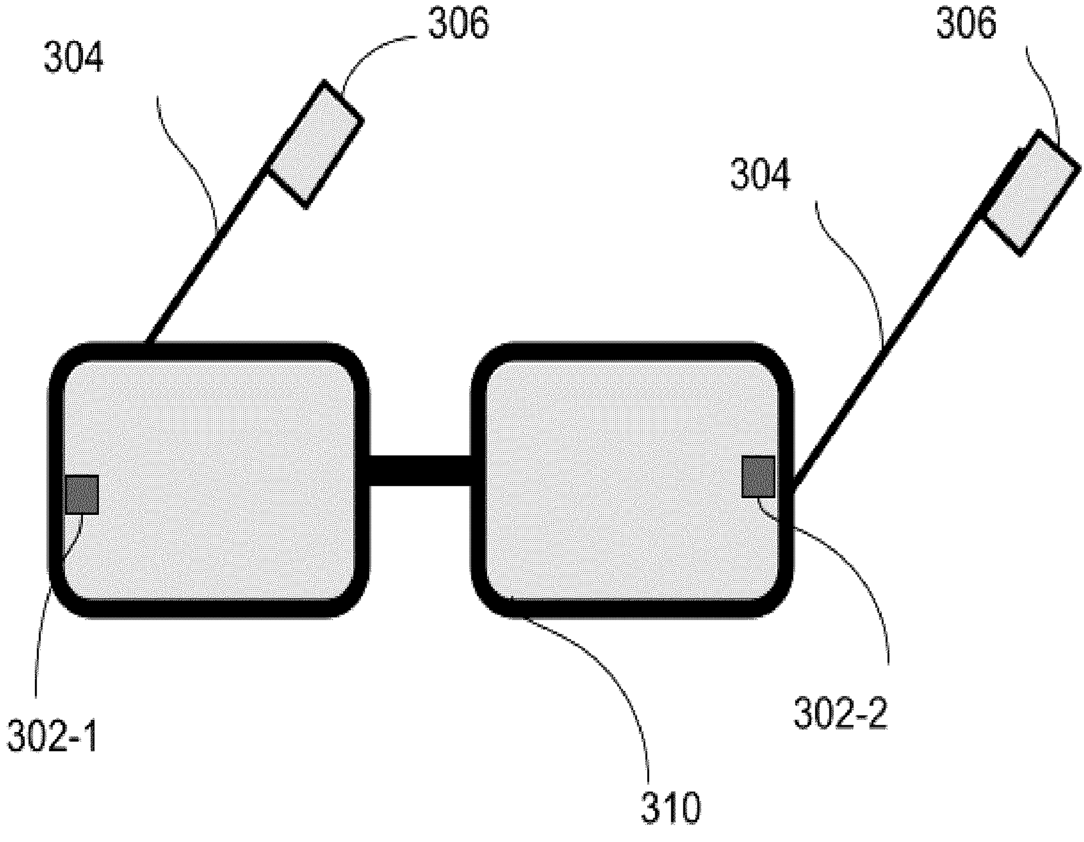
FIG. 3A shows an example of a head mounted device with two displays, in accordance with an embodiment of the invention.

FIG. 3A shows an example of a head-mounted device with two displays in accordance with an embodiment of the invention. Here, one or more displays (302-1, 302-2) may be mounted on the frame 310. Here, for example, the frame 310 comprises the structure of an eyeglass. The optical system may be provided on top of the displays (302-1, 302-2) that project an image from the display 106 into the user's eye. The optical system is placed between the display and the user's eye.

In a head-mounted device, the displays (302-1, 302-2) can be mounted on the glass frame 310 or separately at a proximity edge of the frame arm 304. This allows for flexibility in the design and placement of the displays.

Mounting the displays on the glass frame 310 can help to provide a more seamless and integrated look for the device, and it can also help to protect the displays from damage. Mounting the displays separately at the proximity edge of the frame arm 304 can help reduce the device's size and weight and provide more flexibility in the design of the device.

The combination of the two displays (302-1, 302-2) can cover a wider viewing angle, providing a more immersive experience for the user. This can be particularly useful for virtual reality and augmented reality applications where a wide field of view is important. Additionally, this kind of design can provide redundancy; if one of the displays fails, the other one can still provide the image.

For example, from one side to the center can be covered by the first display (e.g., 302-1) and from the center to the other side can be covered by the second display (302-2).

In another embodiment, an electronic system 306 is coupled at a proximity to another edge of the arm 304. The electronic system may include a processing unit, a communication unit, a synching unit, and a power unit. The processing unit may include a processor to execute instructions. The communication unit may be configured to communicate with the electronic system and the display unit. A data processing unit may be coupled through the arm between the electronic system and the display unit to send and receive data and instructions from the display unit and other units.

Figure 3B:
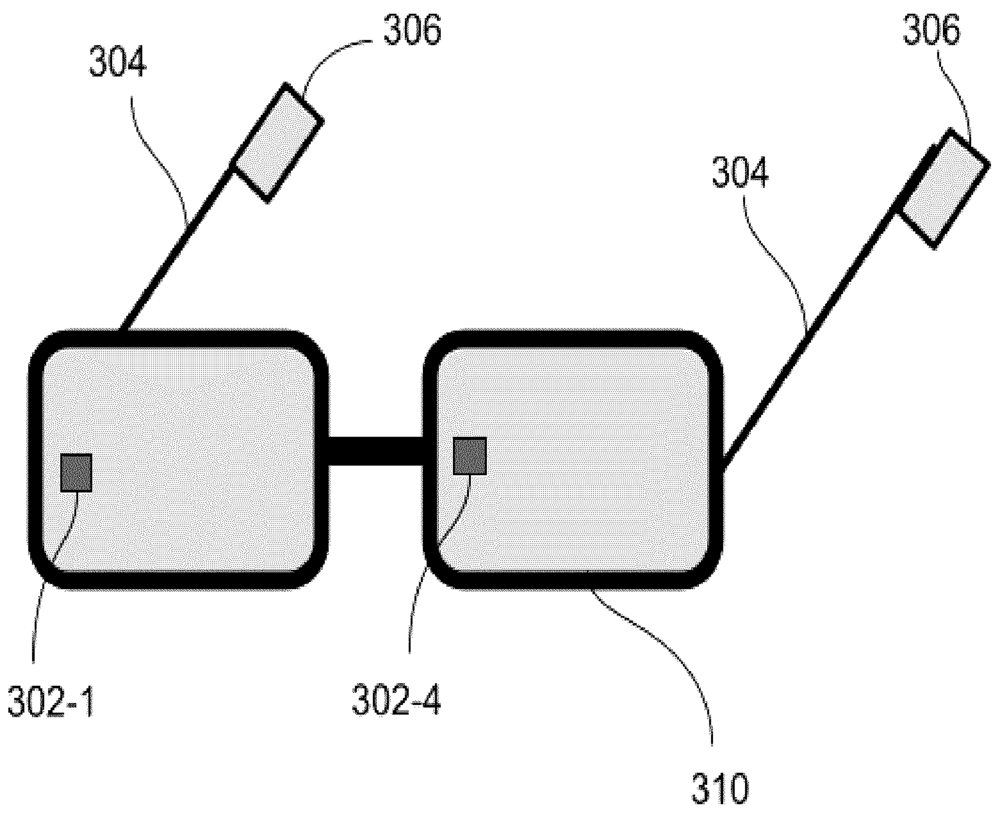
FIG. 3B shows another example of a head mounted device with two displays, in accordance with an embodiment of the invention.

FIG. 3B shows an example of a head-mounted device with two displays in accordance with an embodiment of the invention. Here, one or more displays (302-1, 302-2) may be mounted on the frame 310, where the images will be seen at the same time. In one case, a display (e.g., 302-1) may be mounted at a proximity edge of the glass frame 310 or separately at a proximity edge of the frame arm 304. Other displays (e.g., 302-4) may be mounted further away from the edge of the frame. Here, when a user's eyes tilt toward the displays, the contents of both displays are projected into the eyes (each display is projected in different eyes). This feature can be used to show the 3D images, increase the resolution, or add colour by showing different colours to each display. When a user's eyes tilt toward the displays, the contents of both displays are projected into the eyes, each display projected in different eyes. This can provide a more immersive experience for the user, as the user can view multiple images or scenes simultaneously, and it can also provide more redundancy; if one of the displays fails, the other one can still provide the image. This kind of design is also known as a stereo display, where the image is presented from two different perspectives to the eyes, creating a 3D-like experience.

Figure 3C:
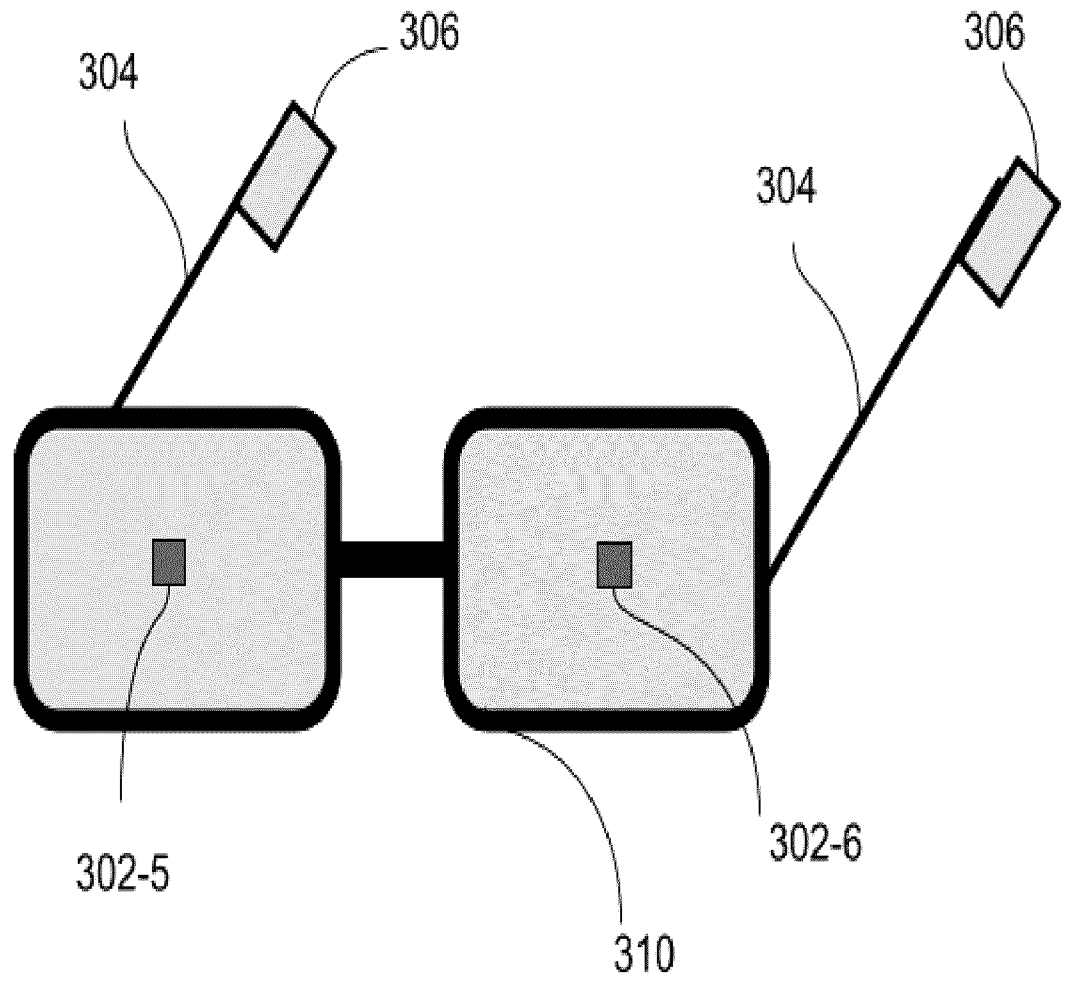
FIG. 3C shows another example of a head mounted device with two displays, in accordance with an embodiment of the invention.

FIG. 3C shows an example of a head-mounted device with two displays in accordance with an embodiment of the invention. The two displays (302-5, 302-6) may be mounted on the frame 310, where the images will be seen at the same time. Here, the displays (302-5, 302-6) are further away from the edge of the frame 310.

In one embodiment, transparent data and power lines may go through a lens carrying signals and power to the display that is placed further away from the edge of the frame. Transparent data and power lines can be used to transmit signals and power to the display that is placed further away from the edge of the frame. This can be accomplished by routing the data and power lines through a transparent lens to the user. The lens can be designed to be thin and unobtrusive so as not to interfere with the user's view. This design can effectively transmit signals and power to the display, even when the display is placed at a distance from the edge of the frame. Additionally, using transparent data and power lines can help reduce the device's visual impact on the user's view and improve the overall visual experience. The choice of the method to transmit the data and power will depend on the specific requirements of the device, the acceptable design trade-offs and the manufacturing process. Some factors that can be considered when selecting the method include the number of displays, the distance between the display and the edge of the frame, and the flexibility of the device.

In another embodiment, coils inside the frame may be coupled with the display to carry signal and power to the display placed further away from the edge of the frame. In an alternative approach, coils inside the frame may be used to carry signals and power to the display placed further away from the edge of the frame. This can be accomplished by embedding coils into the frame, which can be connected to the display through a wireless connection such as magnetic induction or inductive coupling. This design can effectively transmit signals and power to the display, even when the display is placed at a distance from the edge of the frame. Additionally, using coils inside the frame can help reduce the device's visual impact on the user's view and improve the overall visual experience, as the coils are embedded into the frame and not visible to the user. The choice of the method to transmit the data and power will depend on the specific requirements of the device, the acceptable design trade-offs and the manufacturing process. Some factors that can be considered when selecting the method include the number of displays, the distance between the display and the edge of the frame, and the flexibility of the device. Wireless power transmission methods can be more complex but also more flexible and reliable than wired methods, and they can also reduce the number of cables and connectors needed, which can increase the durability of the device.

Figure 4:
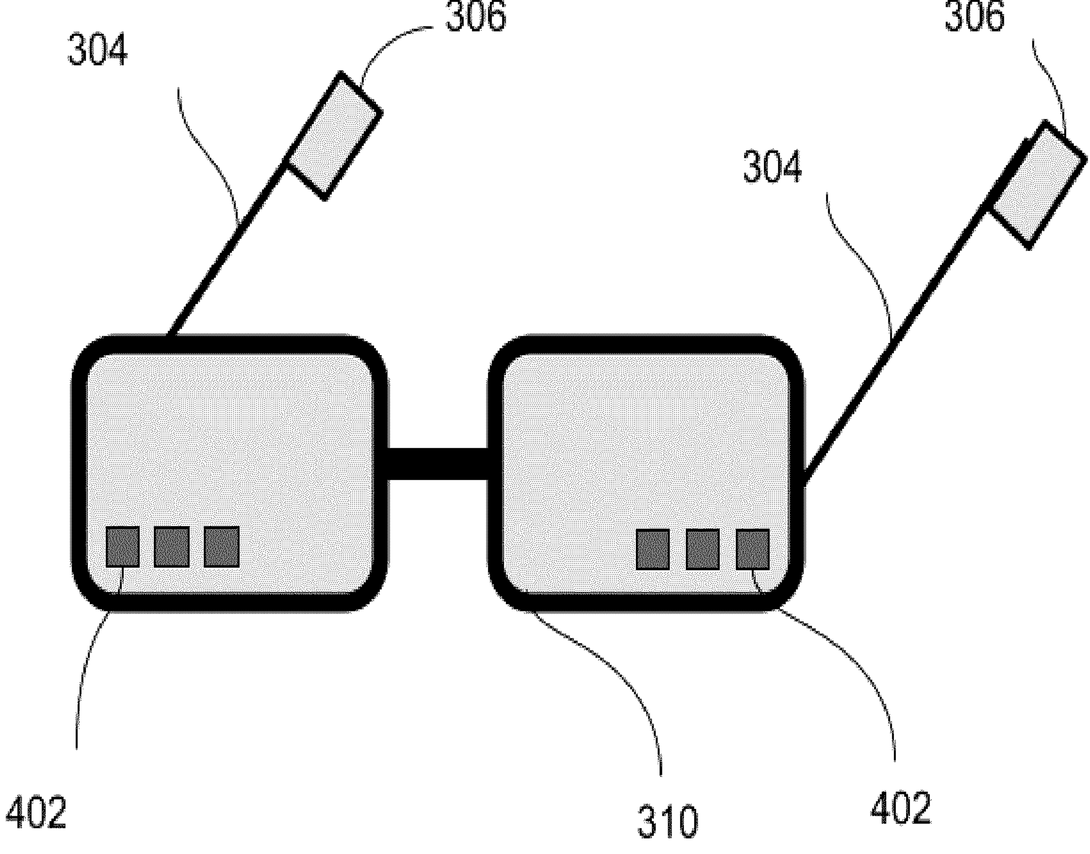
FIG. 4 shows an example of a head mounted device with multiple displays, in accordance with an embodiment of the invention.

FIG. 4 shows an example of a head-mounted device with multiple displays 402 in accordance with an embodiment of the invention. Here, multiple displays 402 may be mounted on the frame for each eye. As the eye moves around different displays 402, the optical system integrated at the top of the display 402 may project all or part of the image to the eye. According to one embodiment, image stitching techniques can create a uniform image. This can provide a more immersive experience for the user, as the user can view multiple images or scenes simultaneously. According to one embodiment, image stitching techniques can create a uniform image by seamlessly combining multiple images from different displays. This can help reduce the device's visual impact on the user's view and improve the overall visual experience. Image stitching can also correct the distortion, alignment, or colour of the images from different displays. The use of multiple displays can increase the field of view and the resolution of the image, and it can also provide more redundancy; if one of the displays fails, the other one can still provide the image.

Also, when a user demands some information, depending on the eye's position, one of the displays can start projecting an image into the eye. The displays and optical system can be smaller than what the eye can see in a space close to the eyes. The displays and optical system can be smaller than 5 mm in one case.

In an alternative embodiment, the arm and the display can also be part integrated into the display device, e.g., eyeglasses.

According to another embodiment, the head-mounted device may comprise a frame having at least one arm, at least one display coupled at a proximity edge (end) of the arm, an electronic system coupled at proximity another edge (end) of the arm, a data processing unit configured to send and receive data from the display, wherein the data processing unit coupled through the arm between the electronic system and the display; and an optical system configured to project an image from the display to a user's eye, wherein the optical system is mounted at the top of the display.

According to yet another embodiment, the optical system may be placed between the display and the user's eye, the electronic system may comprise a computing device, a communication unit, a synching unit, and a power unit and the display comprises a micro light emitting diode microdisplay. The optical system may comprise a concave lens.

According to some embodiments, the arm may be made of transparent materials. The arm comprises conductive traces for communicating and providing power to the display. The arm may be flexible.

According to another embodiment, the head-mounted device may further comprise one or more sensors configured to detect a motion of the eye to start projecting the image from the display and one or more sensors configured to measure the eye focus distance to adjust the optic focal point for the image to be in the focus point of the eye. To train the sensors for measuring the focal point, a test image may be shown to the users at different distances and ask users to focus on those images. The combination of eye movement, the structure of the eye and the reflection of certain lights from the eye can be used to show that The use of sensors can help to provide a more seamless and natural visual experience for the user. The sensors can detect the eye's motion and start projecting the image from the display accordingly. This can help reduce the device's visual impact on the user's view and improve the overall visual experience. Additionally, sensors can measure the eye focus distance, which can be used to adjust the focal point of the optics for the image to be in the eye's focus point. This can help reduce the strain on the user's eyes and provide a more immersive experience for the user, as the image will always be in focus, no matter the distance of the object. This kind of design is also known as a gaze-tracked display, where the device uses sensors to track the user's gaze and adjust the position of the image accordingly. The use of sensors can also provide more advanced features such as foveated rendering, where the device can render the image with higher resolution and quality on the area where the user is looking and lower resolution on the peripheral vision.

According to one embodiment, a head-mounted device may be provided. The head-mounted device may comprise: a frame having at least one arm, at least one display mounted on the frame in front of a user's eye, an electronic system coupled at a proximity edge of the arm, and an optical system placed between the display and the user's eye to project an image from the display to the user's eye.

According to further embodiments, the optical system may comprise a lens, and the arm of the frame carries either power or data signals coupled to the display. At least another display may be mounted at a further edge of the frame.

According to one embodiment, the head-mounted device may comprise one or more sensors configured to detect a specific eye's motion to start projecting the image from the display. In one case, the motion can be moving toward a specific corner or blinking in a pattern.

According to one embodiment, a method of displaying an image on a head-mounted device may be provided. The method may comprise providing a frame having at least one arm, mounting at least one display on the frame in front of a user's eye, coupling an electronic system at a proximity edge of the arm; and placing an optical system between the display and the user's eye to placing an optical system between the display and the user's eye to project an image from the display to the user's eye.

Figure 5:
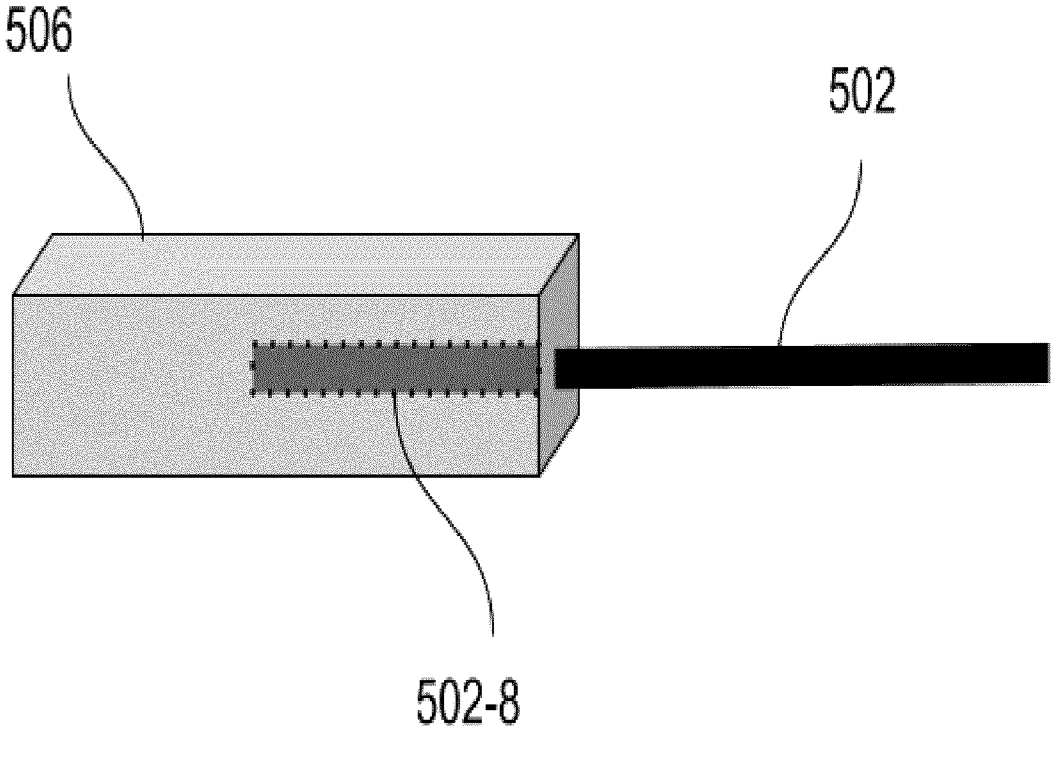
FIG. 5 shows an example of at least one adjustable arm.

In a related embodiment to the structure described here, as given in FIG. 5, arm 502 (or arms) can be adjusted to offer better comfort for the user (a frame having at least one arm adjustable in length). In one related case, there is a housing 502-8 where the arm 502 can be extended out of it or shrunk into housing 502-8. Housing 502-8 can be part of the system unit 506. In another aspect, the arm length may be auto adjustable (storing the excess length of the arm in the housing) by the system for optimal experience based on the optical system configured to project an image from the display to a user's eye. This design can provide a more flexible and customizable fit for the user, as the user can adjust the length of the arm (502) to provide a more comfortable fit. Additionally, this design can help reduce the device's visual impact on the user's view and improve the overall visual experience, as the arm (502) can be adjusted to be as close as possible to the user's head. This kind of design is also known as a variable-focus display, where the device uses a mechanism to adjust the distance between the display and the eye, and thus, adjust the focus of the image. This kind of design can help reduce the strain on the user's eyes and provide more flexibility in the design of the device. Using a housing (502-8) can also provide a more robust and durable design for the device, as the arm (502) can be protected when it is not in use.

In a related embodiment the head mounted display refers to a head-mounted device with a microLED display providing a high-quality visual experience for the user, and a small size of LED lights providing a more compact and a lightweight design of the device.

In a related embodiment the head mounted display refers to an arm of the frame of the HMD which is used to carry either power or data signals that are coupled to the display, to reduce a number of cables or connectors required for the device.

In a related embodiment the displays are of different colors for the same type of displays, where in one display may be used for each eye that has a different color filter, such as a red filter and a blue filter, to enable a 3D image.

In a related embodiment the head mounted display uses a device that includes sensors to detect the user's head movements or facial features and uses that information to adjust the display or an audio accordingly, wherein this allows the device to provide a more personalized and comfortable experience for each user, which can improve the overall usability of the device.

While the present disclosure is susceptible to various modifications and alternative forms, specific embodiments or implementations have been shown by way of example in the drawings and are described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

The invention claimed is:

1. A head mounted device (HMD) comprising:

a frame having at least one arm adjustable in length;

at least one display mounted on the frame in front of a user's eye;

an electronic system coupled at a proximity edge of the at least one arm;

an optical system placed between the at least one display and the user's eye to project an image from the at least one display to the user's eye;

contact pads for the at least one display located on the opposite side of a display substrate from which the image is displayed; and display electrodes coupled to conductive traces in the at least one arm carrying at least one of power or signals to the display, wherein the contact pads are connected to display electrodes through via connections, which are small holes that pass through the display substrate and connect top and bottom layers of the at least one display, wherein the via connections are covered by a dielectric layer.

2. The head mounted device of claim 1, further including a housing within the electronic system, the housing for storing and enabling adjustment of a length of the at least one arm.

3. The head mounted device of claim 1, wherein the arm length is auto adjustable based on the optical system configured to project an image from the at least one display to a user's eye.

4. The head mounted device of claim 1, wherein the head mounted device refers to head-mounted devices that are mounted to other head gear including at least one of a hat, headband, helmet, and face mask which provides additional support and stability for the head mounted device.

5. The head mounted device of claim 1, wherein the at least one display includes displays of the same type or displays of different colors wherein a different display of the at least one display may be used for each eye and have a different color filter enabling a 3D image.

6. The head mounted device of claim 1, wherein the head mounted device is adjustable for different users using adjustable straps or bands to fit the device securely to the user's head, adjustable lenses or optics to accommodate different vision needs, or adjustable interpupillary distance (IPD) to align the display with the user's eyes.

7. The head mounted device of claim 1, wherein the head mounted device uses a device that includes sensors to detect the user's head movements or facial features and uses that information to adjust the display or an audio.

8. The head mounted device of claim 1, wherein the head mounted device has a connection part, also known as the interface, which is flexible and adjustable for different users.

9. The head mounted device of claim 1, wherein the at least one display is an emissive display, also referred to as a head mounted device with a microLED display.

10. The head mounted device of claim 1, including optical devices having a combination of lenses, wherein one of the lenses is a convex lens.

11. The head mounted device of claim 1, wherein portions of the display substrate is transparent forming a see-through display, wherein the user sees the real world through the display, and digital content is superimposed on top of it.

12. The head mounted device of claim 1, wherein the head mounted device adjusts the distance between the at least one display and optics changing the position of the projected image relative to the eye.

13. The head mounted device of claim 1, wherein the head mounted device uses a liquid crystal lens to change the refractive index of the lens, to adjust a focus of the lens.

14. The head mounted device of claim 1, wherein the head mounted display uses image stitching techniques to create a uniform image by combining multiple images from different displays seamlessly.

15. The head mounted device of claim 1, wherein the head mounted display uses sensors to detect the motion of the eye and start projecting the image from the display accordingly.

16. The head mounted device of claim 1, further including a housing within the electronic system, the housing for storing and enabling adjustment of a length of the at least one arm.

17. The head mounted device of claim 1, wherein the arm length is auto adjustable based on an optical system configured to project an image from the at least one display to a user's eye.

18. The head mounted device of claim 1, wherein the head mounted device refers to head-mounted devices that are mounted to other head gear including at least one of a hat, headband, helmet, and face mask which provides additional support and stability for the head mounted device.

19. The head mounted device of claim 1, wherein the at least one display includes displays of the same type or displays of different colors wherein a different display of the at least one display may be used for each eye and have a different color filter enabling a 3D image.

20. The head mounted device of claim 1, wherein the head mounted device uses a device that includes sensors to detect the user's head movements or facial features and uses that information to adjust the display or an audio.

21. The head mounted device of claim 1, wherein the at least one display is an emissive display, also referred to as a head mounted device with a microLED display.

22. The head mounted device of claim 1, including optical devices having a combination of lenses, wherein one of the lenses is a convex lens.

23. The head mounted device of claim 1, wherein portions of the display substrate is transparent forming a see-through display, wherein the user sees the real world through the display, and digital content is superimposed on top of it.

24. The head mounted device of claim 1, wherein the head mounted device uses a liquid crystal lens to change the refractive index of the lens, to adjust a focus of the lens.

25. The head mounted device of claim 1, wherein the head mounted display uses image stitching techniques to create a uniform image by combining multiple images from different displays seamlessly.

26. The head mounted device of claim 1, wherein the head mounted display uses sensors to detect the motion of the eye and start projecting the image from the display accordingly.

27. A head mounted device (HMD) comprising:

a frame having at least one arm adjustable in length;

at least one display mounted on the frame in front of a user's eye;

an electronic system coupled at a proximity edge of the at least one arm; and at least one eye open area wherein an image gets out of a substrate through the at least one open eye area and the at least one open eye area is coupled to an optical structure to project the image into the user's eyes.

* * * * *